US009846582B2

(12) United States Patent
Knichel et al.

(10) Patent No.: US 9,846,582 B2
(45) Date of Patent: Dec. 19, 2017

(54) OPERATING SYSTEM HARDWARE CONFIGURATION STATE SPECIALIZATION

(75) Inventors: Jason C. Knichel, Seattle, WA (US); Adam Lenart, Seattle, WA (US); James G. Cavalaris, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 578 days.

(21) Appl. No.: 13/612,252

(22) Filed: Sep. 12, 2012

(65) Prior Publication Data

US 2014/0075172 A1 Mar. 13, 2014

(51) Int. Cl.
G06F 15/177 (2006.01)
G06F 9/44 (2006.01)

(52) U.S. Cl.
CPC ................... *G06F 9/4401* (2013.01)

(58) Field of Classification Search
CPC .................................................. G06F 9/4401
USPC ............................................................ 713/2
See application file for complete search history.

(56) References Cited

U.S. PATENT DOCUMENTS

| | | | |
|---|---|---|---|
| 5,574,915 A | 11/1996 | Lemon et al. | |
| 6,209,089 B1 | 3/2001 | Selitrennikoff et al. | |
| 6,272,626 B1 | 8/2001 | Cobbett | |
| 6,430,685 B1 * | 8/2002 | Yu et al. | 713/1 |
| 6,944,867 B2 | 9/2005 | Cheston et al. | |
| 7,356,679 B1 * | 4/2008 | Le | G06F 17/30067 707/E17.01 |
| 7,797,525 B2 * | 9/2010 | Lee et al. | 713/2 |
| 2004/0019778 A1 * | 1/2004 | Gere | G06F 9/4406 713/2 |
| 2004/0088531 A1 | 5/2004 | Rothman | |
| 2005/0193188 A1 * | 9/2005 | Huang | 713/1 |
| 2010/0017798 A1 * | 1/2010 | Burkhardt et al. | 717/175 |

OTHER PUBLICATIONS

"How Configuration Passes Work", Retrieved at <<http://technet.microsoft.com/en-us/library/cc749307(v=ws.10).aspx>>, Retrieved Date: Jun. 29, 2012, pp. 6.

(Continued)

*Primary Examiner* — Kim Huynh
*Assistant Examiner* — Eric Chang

(57) ABSTRACT

In one or more embodiments, hardware configuration state data for specialization of a portable installation of an operating system may be stored on a per hardware configuration basis. Specializations may include designation of boot start drivers, driver settings, device settings, and other state data that may vary based on hardware configurations of different machines on which the portable operating system is loaded. In a pre-boot environment, an identity of the current computing device is resolved and used to look-up corresponding hardware configuration state data that is available. When booting of the operating system on a new computing device is detected, the operating system is loaded using default state settings. An optimization routine may then be performed to create and store hardware specific hardware configuration state data for the computing device that defines specializations for subsequent boots of the operating system on the computing device.

20 Claims, 5 Drawing Sheets

(56) References Cited

OTHER PUBLICATIONS

"How to Maintain Driver Configurations when Capturing a Windows Image", Retrieved at <<http://technet.microsoft.com/library/hh825712.aspx>>, Feb. 29, 2012, pp. 8.

* cited by examiner

OPERATING SYSTEM HARDWARE CONFIGURATION STATE SPECIALIZATION

BACKGROUND

Traditionally, an instance of operating system (OS) installation is associated exclusively with an individual computing device. Thus, any specializations for a given OS installation may be made for the particular hardware of the individual computing device without regard to separate installations on different systems and platforms. Some modern operating systems, though, enable features to migrate an instance of operating system installation to different machines at different times by way of portable storage devices, network-accessible storage and/or other storage. Traditional techniques to handle specialization for a single machine configuration do not provide mechanisms that are suitable for booting of a portable OS installation across different machines that may have different hardware configurations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Operating system hardware configuration state specializations are described. In one or more embodiments, hardware configuration state data for specialization of a portable installation of an operating system is stored on a per hardware configuration basis. Specializations may include designation of boot start drivers, driver settings, device settings, and other state data that may vary based on hardware configurations of different machines on which the portable operating system is loaded. In a pre-boot environment, an identity of the current computing device is resolved and used to look-up corresponding hardware configuration state data that is available. When booting of the operating system on a new computing device is detected, the operating system is loaded using default state settings. An optimization routine may then be performed to create and store hardware specific hardware configuration state data for the computing device that defines specializations for subsequent boots of the operating system on the computing device.

DETAILED DESCRIPTION

Overview

A modern operating system (OS) may enable migration of an operating system installation to different machines by way of portable storage devices, network-accessible storage devices, or other storage. Traditional techniques to handle specializations for a single machine configuration, however, may not provide suitable mechanisms to specialize a portable OS installation across different machines that may have different hardware configurations.

Operating system hardware configuration state specializations are described. In one or more embodiments, hardware configuration state data for specialization of a portable installation of an operating system is stored on a per hardware configuration basis. Specializations may include designation of boot start drivers, driver settings, device settings, and other state data that may vary based on hardware configurations of different machines on which the portable operating system is loaded. In a pre-boot environment, an identity of the current computing device is resolved and used to look-up corresponding hardware configuration state data that is available. When booting of the operating system on a new computing device is detected, the operating system is loaded using default state settings. An optimization routine may then be performed to create and store hardware specific hardware configuration state data for the computing device that defines specializations for subsequent boots of the operating system on the computing device.

In the discussion that follows, a section titled "Operating Environment" is provided and describes one environment in which one or more embodiments can be employed. Following this, a section titled "Operating System Hardware Configuration State Specialization Examples" describes example techniques and details in accordance with one or more embodiments. Last, a section titled "Example System" describes example computing systems and devices that can be utilized to implement one or more embodiments.

Operating Environment

Figure 1:
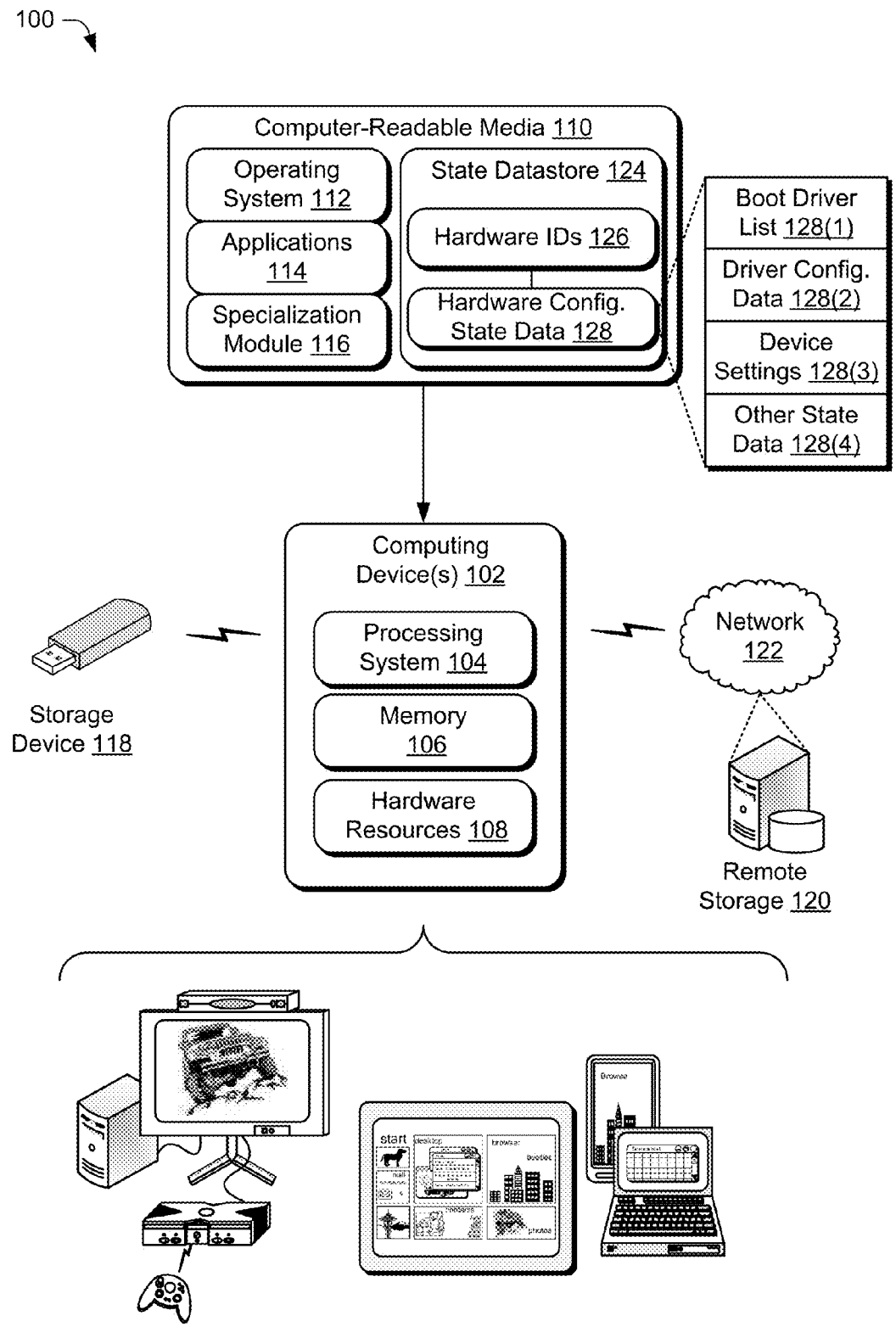
FIG. 1 illustrates an example operating environment in which one or more embodiments of operating system hardware configuration state specialization can be employed.

FIG. 1 illustrates an operating environment in accordance with one or more embodiments, generally at 100. The environment 100 includes a computing device 102 having a processing system 104, memory 106, and various hardware resources 108 that represent different components and devices typically associated with the computing devices. The hardware resources 108 may include integrated components, removable components, and external peripheral devices connectable to the computing device 102 via wired and/or wireless connections.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, and the like. For example, as shown in FIG. 1 the computing device 102 can be implemented as a television client device, a computer, and/or a gaming system that is connected to a display device to display media content. Alternatively, the computing device may be any type of portable computer, mobile phone, portable device, tablet or slate device, and/or may include an integrated display. Any of the computing devices can be implemented with various components, such as one or more processors and memory devices, as well as with any combination of differing components. One example of a computing system that can represent various systems and/or devices including the computing device 102 is shown and described below in FIG. 5.

FIG. 1 further depicts computer-readable media 110 including an operating system 112, one or more applications 114, and a specialization module 116 that reside on the computer-readable media and which may be executed by processing systems 104 associated with different computing devices 102. The operating system 112 therefore represents a portable installation on suitable computer-readable media 110 that may be moved to different computing devices at different times. In addition, a single operating system image may be made available for instantiation on different computers at the same time by way of respective media and/or network accessible storage By way of example, the computer-readable media 110 may be provided by and the operating system 112 installed upon a storage device 118 including but not limited to a universal serial bus flash device (UFD) or other flash memory device, a portable hard drive, storage of a laptop, tablet, a movable or swappable hard drive, mobile phone or other portable computing device, a memory stick, a memory card, a compact disk, or other portable and/or movable media/storage device. The storage device 118 may be removably connected to a computing device 102 via a suitable interface such that the storage device 118 may be connected to different computing devices at different times. In addition or alternatively, the computer-readable media 110 may be provided as and the operating system 112 installed upon on remote storage 120 that may be accessible over a network 122. Thus, the operating system 112 may be booted from different sources of computer-readable media 110 and migrated to different systems. The storage/computer-readable media upon which the operating system 112 is installed may therefore be separate from computing devices upon which the operating system is booted. Further examples of different kinds of computer-readable media 110 are described in relation to the example computing system of FIG. 5.

The specialization module 116 represents functionality to implement techniques for operating system hardware configuration state specializations described above and below. In at least some embodiments, the specialization module 116 is provided as a component of the operating system 112 and/or or a boot program operable to load the operating system on a computing device. The specialization module 116 may be configured to manage and make use of a state datastore 124 to implement per hardware configuration specializations for a portable installation of the operating system 112. The state datastore 124 for instance may be configured to store data that matches hardware identifiers 126 for different computing devices to associated hardware configuration state data 128. The hardware configuration state data 128 represents various types of data that defines specializations for booting the portable OS on the different computing devices.

Accordingly, the specialization module 116 may be operable to distinguish between hardware configurations of different computing devices using suitable hardware identifiers 126 and access corresponding hardware configuration state data 128 from the state datastore 124. The specialization module 116 may also create records with hardware configuration state data 128 for newly encountered hardware configurations when the portable OS is booted on a new system for the first time. Further, each time the portable OS is booted, the specialization module 116 may reference and make use of available hardware configuration state data 128 using hardware IDs and also make updates to the state datastore 124 to reflect changes to existing configurations, deletions, addition of records for new configurations, and so forth.

Various different kinds of hardware configuration state data 128 and corresponding specializations are contemplated. Generally, the specializations refer to drivers, settings, configuration data, and other configuration specific state data that may be selectively filtered and/or applied based upon the identity and particular hardware configuration of a computing device upon which the portable OS is being loaded. Generally, specializations may be applied in a pre-boot environment established by a boot program that includes or makes use of a specialization module 116 as described above and below. As shown in FIG. 1, examples of hardware configuration state data 128 include boot driver lists 128(1), driver configuration data 128 (2), device settings 128(3), and other state data 128(4). Specializations may accordingly be defined to control such things as which drivers are loaded upon start-up, settings for the drivers, and/or settings for devices. These and other aspects are described in greater detail in relation to the following figures.

Having described an example operating environment, consider now example procedures for operating system hardware configuration state specializations in accordance with one or more embodiments.

Operating System Hardware Configuration State Specialization Examples

In the following section, implementation details and example techniques for operating system hardware configuration state specializations are discussed. The discussion includes example procedure(s) that can be implemented in connection with any suitable hardware, software, firmware, or combination thereof. In at least some embodiments, the procedures may be implemented by way of a suitably configured computing device, such as the example computing device 102 of FIG. 1 that accesses and/or makes use of a specialization module 116 in connection with booting a portable operating system installation.

Figure 2:
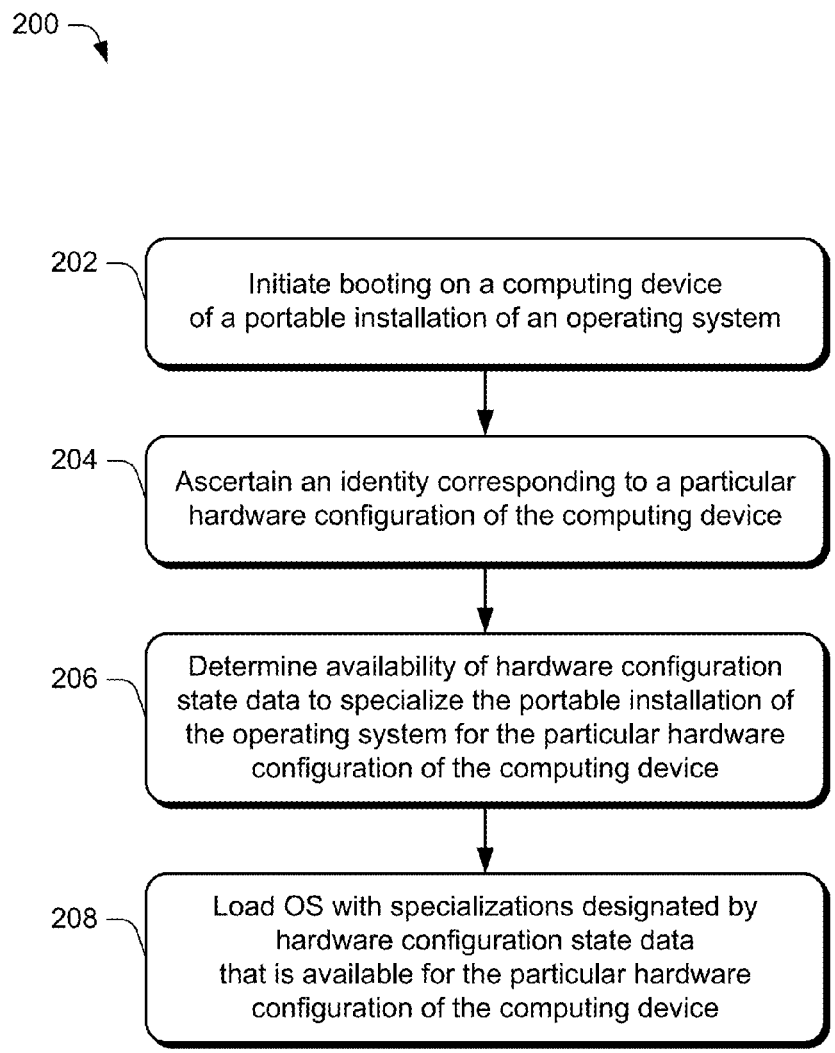
FIG. 2 is a flow diagram that describes details of an example procedure in accordance with one or more embodiments.

FIG. 2 depicts an example procedure 200 in which specializations are implemented in a pre-boot environment. Booting is initiated on a computing device of a portable installation of an operating system (block 202). In particular, when a computing device is powered-up or restarted, a boot program generally executes to initialize the system, run self-tests, and identify hardware resources of the system. Further, the boot program may also perform operations to configure the hardware resources for use and load an operating system for the device. In accordance, with techniques described herein, the boot program may also include or make use of a specialization module 116 that operates as described above and below. The boot program and specialization module 116 may be provided by way of a portable installation of an operating system 112 available on a storage device 118 or remote storage 120 as discussed in relation to the example operating environment of FIG. 1.

An identity is ascertained that corresponds to a particular hardware configuration of the computing device (block 204). An identity corresponding to the hardware configuration of a computing device may be resolved in any suitable way. Generally, the specialization module 116 operates to obtain a hardware identifier 126 that is associated with a particular computing device 102 and/or a particular combination of hardware resources 108 for the particular computing device.

In one approach, a hardware identifier 126 to identify a particular hardware configuration may be derived by the specialization module 116 upon start-up of a computing device. This may involve examining hardware resources 108 for a computing device and creating an identifier based on hardware resources 108 that are detected. The identifier may be derived based upon a combination of device specific IDs associated with different hardware resources. For instance, the specialization module 116 may be configured to interact with system firmware of the computing device to enumerate different available hardware resources and generate a corresponding hardware identifier 126 for the computing device that may be used to differentiate between different computing devices. Different identifiers may be derived for each different hardware configuration detected as the operating system is roamed to different devices. Thus, hardware configuration state data 128 may be managed on a per hardware configuration basis in some scenarios. In addition or alternatively, in some embodiments individual computing devices may be assigned different identifiers even if some devices have the same hardware configuration. This enables hardware configuration state data 128 to be managed separately (e.g., device-by-device) for each different device upon which the OS installation is booted.

In addition to or in lieu of deriving identifiers as just described, the specialization module 116 may also be configured to retrieve existing identifiers from a source configured to provide such identifiers. Some example identifiers that may be retrieved include a device serial number, a media access control (MAC) address, vendor assigned hardware IDs, or other data suitable to distinguish different computing devices from one another. The identifier may also be configured as a machine/device identifier that is supplied by a user. For example, the specialization module 116 may prompt a user to input a nickname or ID for a device when the OS is initially booted on the device. The user-supplied nickname or ID may then be stored and subsequently accessed to distinguish between different devices and implement techniques for state specialization. An original equipment manufacturer (OEM), independent hardware vendor (IHV) or administrator may also supply a particular hardware identifier in some scenarios. In at least some cases, the specialization module 116 may retrieve these or other comparable identifiers by querying system firmware of the computing device, reading a designated registry key/value or other designated parameter, or otherwise looking-up an existing hardware identifier from a pre-determined storage location.

Availability of hardware configuration state data to specialize the portable installation of the operating system for the particular hardware configuration of the computing device is determined (block 206). Then, the operating system is loaded with specializations designated by hardware configuration state data that is available for the particular hardware configuration of the computing device (block 208). Here, the specialization module 116 may employ the identity determined per block 204 to look-up hardware configuration state data 128 that is associated with the identity. For example, the specialization module 116 may compare the identifier to records maintained in a state datastore. When an OS implementation has previously been booted on a particular machine, specializations established in connection with one or more prior boots may be available as records in the state datastore 124. Therefore, the specialization module may operate to access and apply records containing hardware configuration state data corresponding to the particular machine by matching the hardware identifier 126 to available records.

On the other hand, when the OS is booted for the first time on a particular computing device, the state datastore 124 may not yet contain hardware configuration state data associated with the particular computing device. When hardware configuration state data is unavailable, the OS may be booted using default state data and/or settings. Then, an optimization routine may be performed to establish specializations to apply for subsequent boots of the OS implementation on the computing device/hardware configuration. The specialization module 116 may generate hardware configuration state data 128 to define such specializations and store the data in association with a hardware identifier 126 obtained per block 204. The process of selectively applying available specializations based on hardware configuration state data as well as some examples of various specializations that may be implemented are described in greater detail in relation to the following figures.

Figure 3:
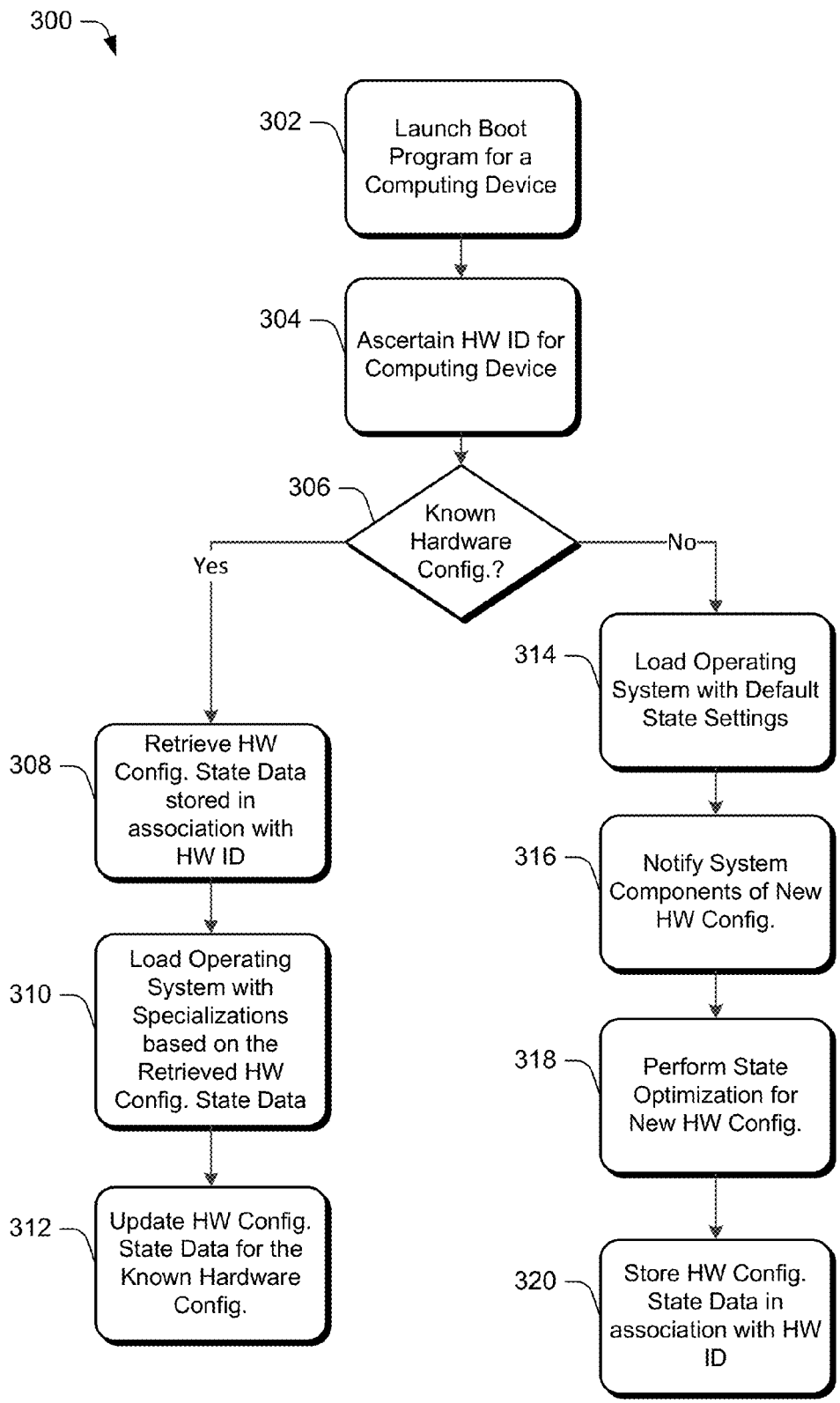
FIG. 3 is a flow diagram that describes details of another example procedure in accordance with one or more embodiments.

FIG. 3 depicts an example procedure 300 in which specializations are applied on a per hardware configuration basis. A boot program is launched for a computing device (block 302). For instance, a boot program associated with a portable installation of an operating system 112 may be executed via a processing system 104 of a computing device 102. The operating system 112 and boot program may be loaded from computer-readable media 110 corresponding to a storage device 118 or remote storage 120. The boot program may include or otherwise make use of a specialization module 116 to manage and apply specializations across different computing devices and/or hardware configurations as described herein.

A hardware identifier for the computing device is ascertained (block 304) and then a determination is made regarding whether or not the computing device has a known hardware configuration (block 306). For instance, a hardware identifier or other data suitable to identify the computing device and associated hardware may be obtained during a boot sequence in the manner described in relation to FIG. 2. Based on the identity, the specialization module 116 may determine whether the device on which the operating system is currently being loaded has an existing hardware configuration that the system is already aware of Here, an existing configuration may refer to a computing device and/or hardware configuration that was encountered with respect to preceding boots. As mentioned, hardware configuration state data for such preceding boots across various computing devices may be stored on a per device/configuration basis using respective identities. Thus, the determination of whether the current configuration is "known" may occur by comparing the hardware configuration to one or more known configurations that were encountered in relation to previous boots of the portable OS installation and that may be associated with existing records for hardware configuration state data and/or specializations.

In one embodiment, the specialization module 116 is configured to track hardware configurations from boot to boot and may detect when the hardware/computing device has changed. The detection may occur in various ways, such as by comparing an identifier to known identifiers, making a resource-by-resource comparison between resources of the current system and one or more previously encountered systems, or otherwise checking currently available hardware resources 108 against known configurations. In this way, the specialization module 116 may determine when the portable OS is booted on different computing devices. In response to detection of a change, the specialization module 116 may be configured to look-up and apply existing hardware configuration state data for known configurations if available. If the hardware/computing device is determined to be a newly encountered configuration, though, the specialization module 116 may operate to establish specializations and store records that may be employed to implement the specializations on subsequent boots.

In particular, when the hardware configuration is known per block 306, hardware configuration state data stored in association with a hardware identifier for the computing device is retrieved (block 308). The hardware configuration state data may be applied to load the operating system with specializations based on the hardware configuration state data (block 310). For example, a list describing a custom set of boot start drivers tailored to the hardware configuration may be retrieved from a state datastore 124 and the drivers may be pre-loaded. Accordingly, pre-loading of excessive and unnecessary default boot start drivers may be avoided to optimize the boot. Additional specializations such as hardware specific driver configurations, individual settings for hardware resources 108 (e.g., device settings), and/or application settings may also be implemented. Further details of different kinds of specializations that may be implemented and some example scenarios for hardware configuration state specialization can be found in relation to FIG. 4 below.

Hardware configuration state data for the known hardware configuration may be updated (block 312). Here, existing hardware configuration state data 128 may be modified to reflect any changes made during the boot process and/or run-time session with the OS on the computing device. Changes may occur based upon addition or removal of hardware, re-optimization of the hardware configuration state that alters specializations, user input to designate changes to hardware configuration state data, changes dictated by applications 114, and so forth. The specialization module 116 may manage these and other changes by modifying hardware configuration state data 128 accordingly to add, delete, alter, and/or otherwise change records associated with the identity of a computing device 102 as appropriate. Hardware configuration state data as updated may then be employed for subsequent boots of the OS on the corresponding computing device. This re-optimization process to update the hardware configuration state data may be configured to occur each time the system is booted to refine specializations over time.

When the hardware configuration is not known per block 306 (e.g., the device/configuration is initially encountered), the operating system is loaded with default state settings (block 314). For example, default state settings such as a default boot driver list, driver/device settings, and other default state data may be employed since specific hardware may be unknown and optimizations may not yet have been performed for the particular computing device and/or associated hardware. The default state settings may be configured to provide wide coverage of possible resources. As the default state settings are not optimized for the particular device/hardware, though, using the default state settings may cause loading of some drivers and application of some settings that are unnecessary for the specific hardware.

Accordingly, the specialization module 116 may be configured to perform an optimization routine to establish specializations that tailor state settings to the particular device/hardware. Such specializations may be matched to an identity and/or hardware identifier for the device/hardware, stored in a state datastore, and employed for subsequent boots on the particular device/hardware Optimization of the state for a particular device/hardware may occur in various ways. In at least some embodiments, the optimization routine involves notifying one or more system components of the new hardware configuration (block 316), performing state optimization for the new hardware configuration (block 318) and storing hardware configuration state data in association with a hardware identifier for the particular device/hardware (block 320).

For example, when new hardware is detected the specialization module 116 may be configured to notify one or more other system components in various ways. The notification alerts other system components of changes as the OS is migrated to different devices. These system components may be configured to implement their own specializations in response to the notification. In one approach, the specialization module 116 may write a hardware identifier as a value of a designated parameter at defined location that system components may access and look-up to discover when the OS is booted on different hardware configurations. The designated parameter may be a registry entry, a data object, a database entry, a value maintained in a particular dynamic link library (dll) or other file, or any other suitable parameter that system components are designed to reference. The system components may then implement specialized settings for drivers, devices, and/or applications based upon the particular hardware. The specialization module 116 may also operate to established hardware specific specializations including determining boot drivers corresponding to available hardware, customizing driver configurations, and/or altering device settings to match the hardware.

Specializations made by the various components may be supplied to the specialization module 116 and associated with hardware identities. Specialization module 116 also associates its own specializations with the identity of the computing device. For example, specializations may be stored in a state datastore 124 as hardware configuration state data 128 that is associated with hardware identifiers 126. In one approach, the state datastore may provide one or more system components with dedicated storage for corresponding custom state data to implement specializations. A namespace hierarchy may be employed such that custom state data for components is stored in association with a corresponding datastore namespace on a per hardware configuration basis. Thus, for each hardware identifier 126 the datastore may contain one or more datastore namespaces corresponding to individual components under the hardware identifier. These datastore namespaces may be employed to store respective state data for a particular hardware configuration matching the hardware identifier. On subsequent boots, hardware configuration state data 128 available for a particular hardware configuration may be detected per block 306 and applied in the manner discussed in relation to blocks 308 to 310.

Figure 4:
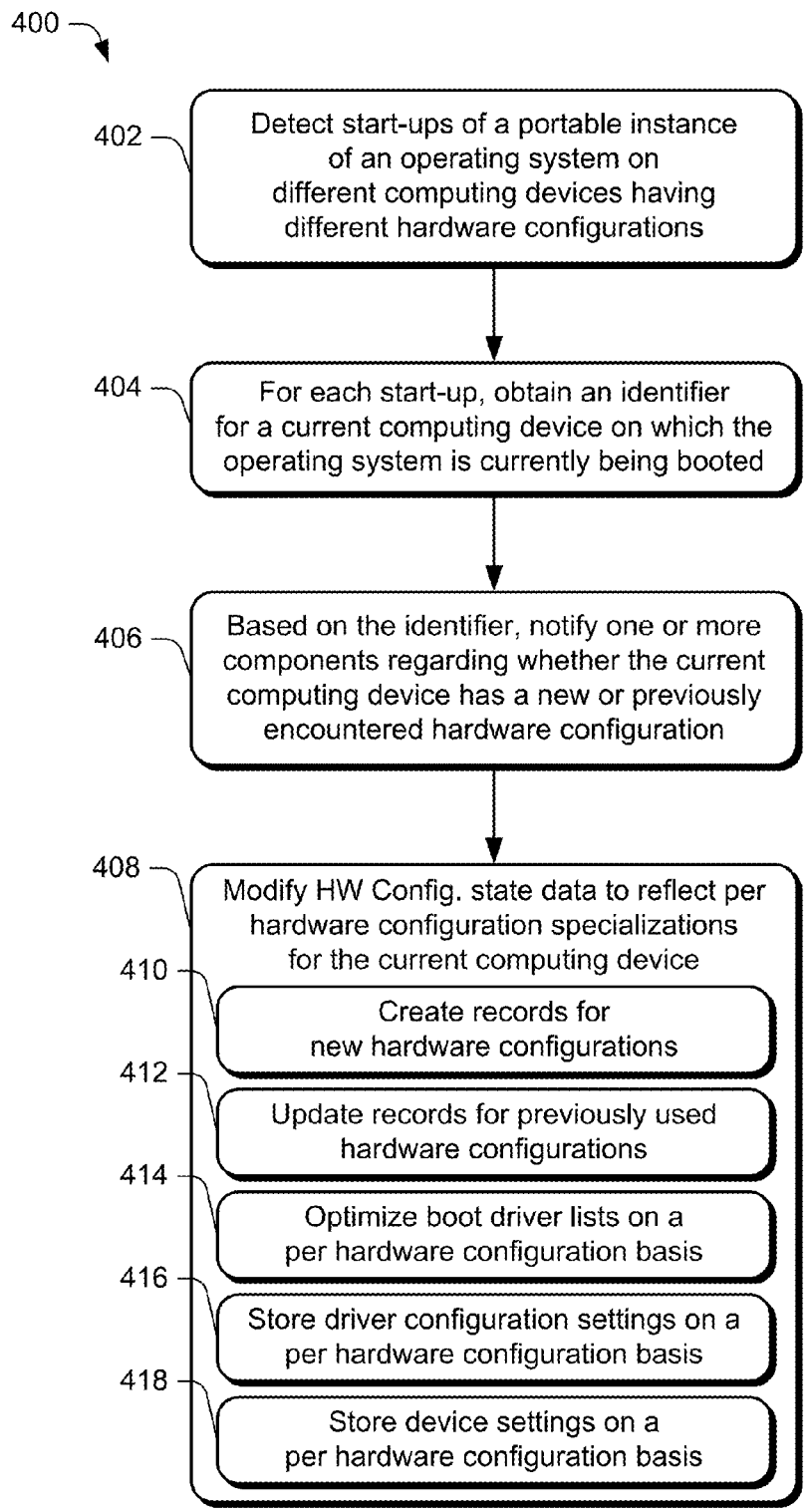
FIG. 4 is a flow diagram that describes details of still another example procedure in accordance with one or more embodiments.

To further illustrate consider FIG. 4, which depicts another example procedure 400 in which specializations are established based on hardware configurations across multiple computing devices. Start-ups are detected of a portable installation of an operating system on different computing devices having different hardware configurations (block 402). For each start-up, an identifier is obtained for the current computing device on which the operating system is currently being booted (block 404). For instance, a specialization module 116 may operate to detect hardware changes when a portable OS is booted. The specialization module 116 may also generate or otherwise obtain identifiers to distinguish between different hardware configurations using previously described techniques.

Based on the identifier, one or more components are notified regarding whether the current computing device has a new or previously encountered hardware configuration (block 406). The notification may occur in any suitable way. The notification may identify the current computing device and/or indicate whether the configuration has changed relative to the last boot so that system components may react accordingly. The notification may be configured to occur when a new configuration is detected as discussed in relation to FIG. 3. Notifications may also be sent based on a detection of a change in hardware from the previous boot regardless of whether the current configuration is new or has been previously encountered. Thus, system components may be notified whenever the hardware configuration is different from a hardware configuration used the last time the OS implementation was booted.

As mentioned, in one approach the specialization module 116 may write a registry value (or value for another designated parameter) to notify system components regarding hardware configuration changes. In addition or alternatively, the specialization module 116 may be configured to send one or more messages to publish or broadcast a hardware identity (e.g., hardware identifier 126) to different components using a designated communication protocol. In another approach, system components may query the specialization module 116 to discover the current hardware configuration and/or obtain details regarding the hardware configuration. This may involve referencing hardware details from a state datastore, a hardware manifest associated with system firmware, or other suitable data records that are available via the specialization module 116 and describe the current hardware configuration. System components may then take advantage of hardware details to implement their own specializations according to the current hardware configuration. For example, different user interfaces may be exposed and/or device settings may be selectively adapted by system components in response to the notification.

The specialization module 116 also may look-up and makes use of available hardware configuration state data 128 for the current boot as described in relation to FIG. 3. For newly encountered systems, default state settings are employed. For previously encountered systems previously entered hardware configuration state data 128 may be accessed and applied to implement corresponding specializations. In either case, the OS may be loaded and modifications of the hardware configuration state data 128 may occur to set-up specializations for subsequent boots on the particular system.

In particular, hardware configuration state data is modified to reflect per hardware configuration specializations for the current computing device (block 408). Here, specializations based on particular hardware of the current computing device may be implemented by optimizing the system and hardware configuration state data for the particular hardware. The modifications may include creating records for new hardware configurations (block 410) and updating existing records for previously used hardware configurations (block 412).

The hardware configuration state may be optimized in various ways to produce corresponding specializations of the boot sequence. By way of example, boot driver lists may be optimized on a per hardware configuration basis (block 414). Boot driver lists 128(1) may be implemented to control which drivers are booted upon start-up. If a driver for a boot disk or other critical device is not loaded, the system may not boot properly. Loading a bunch of drivers to support a variety of possible hardware, though, consumes memory and processing power and may lead to longer boot times. To optimize this process, the specialization module 116 may be configured to check a default boot start driver list against actual hardware and create an optimized list. The optimized boot driver list indicates drivers to pre-load upon boot with respect to a particular hardware configuration. Generally, an optimized boot driver list is scoped down to a designated subset of the default drivers that match actual hardware and may enable the OS to boot properly. Unnecessary drivers that otherwise would be pre-loaded by default may be removed from the list.

The concept of scoping down a driver list may be extended beyond pre-loading of drivers designated as boot start drivers. More generally, the specialization module 116 may adaptively identify any type of drivers to load at different phases of the boot process in a comparable manner. For example, a list of hardware for a computing device may be generated dynamically through interaction with system firmware. A fixed list of hardware produced during a previous optimization of the computing device may also be employed. The list of actual hardware associated with the computing device may then be used to match drivers to hardware and control driver loading on boot start as well as at other phases, such as on system start or on demand. Based on the hardware configuration some drivers may be selected for pre-loading and other drivers may be set for loading after booting and/or on-demand at run-time. Selected drivers for a particular configuration may then be pre-loaded at the same time or in multiple stages to optimize performance Additionally, driver configuration settings may also be stored on a per hardware configuration basis (block 416). Further, device settings may be stored on a per hardware configuration basis (block 418). Thus, in addition to storing data regarding boot driver lists 128(1), the state datastore 124 may also include driver configuration data 128(2) and device settings 128(3) used to implement driver configuration settings and/or device settings respectively on a per hardware configuration basis. In addition or alternatively, different portions of a storage device 118 or remote storage 120 may be configured to store different kinds of state data.

By way of example, at least some driver configuration settings may be dependent upon the particular hardware of a device. For example, a manufacturer may supply a driver that provides support for multiple different similar devices such as a group of controllers, printers, or storage drives. Thus, some driver configuration settings may change depending upon which of the particular group of devices is actually present and capabilities of the device. For example, the type of trays associated with a printer may determine settings (e.g., duplex or not, paper size, and so forth) that may be reflected in driver configuration settings on a per hardware configuration basis.

Likewise some device settings may also be dependent upon the particular hardware configuration of a device. For example, the same communication interface may have different settings based upon the networking capabilities of different computing devices upon which a portable OS is loaded. Different communication protocols may also be employed with different hardware configurations. In another example, settings for a device such as a microcontroller used with different systems may be modified and/or set for different modes to optimize performance of different kinds of input devices or accessories associated with the different systems. For instance, the microcontroller may be optimized on one system to handle touch input, optimized on another system for stylus input, and optimized on yet another system for voice command control.

With respect to driver settings, device settings, and other state settings, the settings may be designated as global or hardware specific. Individual components, drivers, and devices may even have a combination of some global and some hardware specific settings. The global settings may be applied for each device and hardware configuration. Hardware specific settings may be mapped to a particular hardware identifier 126 and applied when the particular device that is identified on start-up matches the hardware identifier as previously described. The specialization module 116 may be configured to detect and determine whether to apply global and hardware specific settings in different scenarios. For example, specialization module 116 may be configured to look-up and apply any global settings available for a driver or device. If global settings are not available for one or more individual settings, the specialization module 116 may determine whether there are any hardware specific settings stored for the one or more individual settings and apply the settings. In this manner, the system may be configured to selectively manage and apply both global and hardware specific settings.

Other kinds of optimizations are also contemplated. For example, start-up applications may be selectively enabled or disabled based on the hardware configuration. For instance, a picture sharing application may be set to launch on start-up device on a device having a camera whereas on a device that does not have a camera, the launch of the picture sharing application may be bypassed. Moreover, certain OS services may be bypassed or remain shut-off to conserve resources if corresponding hardware is not available. For example, touch control services may remain off on a device that does not support touch input. User interfaces may also be modified or selectively exposed in accordance with a hardware configuration. Any such per hardware configuration settings and state data may be stored as part of hardware configuration state data 128 and used to control how the OS boots.

As such, hardware configuration state data 128 may define multiple different types of specializations for booting of an OS across different computing devices. Moreover, a state datastore 124 may be a multi-purpose database that includes multiple different types of specializations. Accordingly, for each different computing device and/or configuration upon which the portable OS is booted, the state datastore 124 may be configured to maintain corresponding records that define specializations to apply for booting on each different computing device and/or configuration. These records may include but are not limited to boot driver lists 128(1), driver configuration data 128(2), and device settings 128(3) as previously described.

As an OS implementation is migrated between devices, state data for each device may be accumulated on a per hardware configuration basis. Over time, data accumulated for many different configurations may consume quite a bit of storage space and some of the data may become stale. Accordingly, specialization module 116 may be configured to manage per hardware configuration state data in various ways. For example, the specialization module 116 may provide an interface through which records associated with a hardware identifier 126 may be accessed and managed manually. Records may be retrieved and displayed based upon input of a hardware identifier. The records may then be manually edited and/or deleted. This enables a user to modify per hardware configuration state data and choose old or unused configurations to delete through explicit input. The user may also designate some configurations to keep thereby protecting these configurations from being removed. Configurations to keep may be selected individually and/or a value for a designated number of different configurations to keep may be set.

In addition or alternatively, an automatic clean-up process to remove stale and/or unused records may be implemented. The clean-up process may be invoked in response to a designated trigger such as a periodic timer, by manual input to initiate the clean-up process, or otherwise. The clean-up process may be configured to recognize and remove per hardware configuration state data based upon various criteria established to control the removal. For example, time-based criteria may be set to remove records after a set time such as six months or a year. Removal may also be based on a designated number of different configurations to keep as mentioned above. In this case, the designated number of configurations may be kept on a rolling basis such that per hardware configuration state data is automatically removed on a first in first out basis. Another approach automatically removes configurations based on an amount of time since last use. Here, configurations that have not been used for a designated amount of time are removed. Yet another option is to remove configurations based upon the amount of storage space consumed by per hardware configuration state data. Thus, one or more configurations may be removed when a new configuration is created to keep the total amount of storage consumed below a designated storage capacity allocated for storage of state data. Various other criteria may also be applied to manage records for per hardware configuration state data.

A few scenarios are now described to provide some tangible examples to the reader and illustrate the foregoing concepts. As mentioned, notifications may be employed to enable system components to implement specializations when an OS is migrated between machines. For instance, an information technology (IT) department may have a configuration program that operates to configure settings of devices to work optimally with the company's software and infrastructure. Rather than having employees manually run the program each time a portable OS is migrated to a new computing device, notifications described herein may be employed to automatically run the configuration program. For instance, the IT department may set the configuration program to run automatically in response to a notification from the specialization module 116 that indicates a new hardware configuration for the current boot. The notification may also trigger specializations by the configuration program for the new hardware that may be stored as hardware configuration state data 128 and applied automatically for the next boot on the particular machine.

A multi-purpose store that includes state data on a per hardware configuration basis as described above may also enable users to tailor different devices for different purposes. Consider a user who has two different machines at home. The user may set up one of the machines primarily for gaming and the other machine for productivity applications and web browsing. The user may use the same portable implementation of an OS on both machines. The state specialization techniques and multi-purpose store described herein though enable the machines to have different device, driver, and other settings. Different boot start drivers may also be specified. Per hardware configuration state data stored in association with the identity of the first machine may be optimized for gaming, while per hardware configuration data stored in association with the other machine may be optimized for productivity. Having a multi-purpose store for per hardware configuration settings enables the different state data and settings to be stored and applied for the different machines.

In a further example, another user may use the same portable implementation of an OS from a USB flash drive at both work and home. The computing devices used at both locations may have some identical hardware. The same hardware though may be set-up differently for work and home. Consider a network interface card (NIC) that is the same for both work and home computers used by the user. The user's work network may employ static internet protocol (IP) addresses so the NIC is set up to bind with the static IP address. However, the NIC for the home computer may get an IP address dynamically via dynamic host configuration protocol (DHCP). Having a store for per hardware configuration settings enables the NIC to have different settings at work and home.

Additionally, the management techniques described above may be employed to remove hardware configurations in some scenarios. For example, employees at a call center may be assigned a USB flash drive that contains the operating system they use to perform their jobs (including any customizations). Consider a scenario in which different employees share a group of computers and each user may just use any open computer, boot a portable OS implementation off of the USB flash drive, and essentially perform their job from any selected computer. Over the course of a few months, a particular user's portable OS on the USB flash drive may be booted on tens or even hundreds of different machines and accumulate hardware configuration data and settings from each of them. This clutters up the drive and takes up storage space. Accordingly, at some point the employee may want to free up space by removing some of the hardware configuration data for hardware configurations that become stale or are no longer used. The user may be able to manually remove some stale configurations and/or an automatic clean-up process may run as described above to remove configurations according to designated criteria.

In yet another scenario, particular hardware identifiers may be supplied to cause application of corresponding settings across one or more machines. Effectively, this enables an IT manager, vendor, or other user to deploy particular settings across the one or more machines. For instance, a virtualization vendor may have a deployment system that produces a master virtual machine image (with a portable OS implementation) and copies the master image to other end-user machines (virtual or physical). The copied image may then be used to boot the end-user machines. Even though the end-user machines on which the image is booted are physically different from the machine the master image was prepared on, the virtualization vendor may know that the end-user machines are similar or identical. Thus, instead of treating the machines as different hardware configurations because they are physically different, the virtualization vendor may supply a particular hardware identifier across each of the different machines to force the same state data to be used for each machine. In this scenario, each machine may appear the same from the perspective of the operating system for the master image and therefore the same per hardware configuration data may be applied for each machine.

In another example of specifying a particular hardware identifier for multiple machines, an IT administrator at a university or corporation may want to implement a system in which a new, pristine image of an OS implementation is pulled from a network deployment location for each boot of a machine in a computer cluster. Since each boot starts from a pristine image, this approach may improve maintenance and security of the machines in the computer cluster by preventing modifications made in user sessions from affecting other users and sessions. Instead of handling each machine in the cluster as different hardware configurations, the IT administrator may choose to supply a particular hardware identifier for each machine in the cluster. By so doing, each machine appears the same to the OS implementation being pulled off the network and the same state data may again be applied. Of course different physical machines may be also managed separately in some scenarios by assigning different hardware identifiers to the different machines.

An IT administrator may also be able to block and/or restrict access to certain physical hardware configurations based on a user's clearance level within an organization using a portable OS installation. For example, a blacklist (or whitelist) of hardware configuration identities may be pre-provisioned onto a portable OS installation for a given user that prevents the user from being able to boot on designated computing devices that have classified hardware components beyond their clearance level. In this approach, rather than following a traditional model of keycard clearance into a room full of classified computer hardware, various classifications of computers may be available in the same room with access restrictions being defined as part of portable OS installations for respective users. Effectively, the instance of a portable OS installation is used as a form of authentication within a closed environment to control access to particular hardware.

Further, because portable OS installations as described herein may identify, create, and maintain state data in a state datastore, the state data may be used in security auditing and/or law enforcement forensics scenarios. The state datastore may provide a history of encountered computing devices (e.g., machine id, time, location, etc.) that appropriate authorities may be able to access to reconstruct a user's usage history including times and potentially physical locations and/or possession/access to computer equipment.

Having considered example details and techniques regarding operating system hardware configuration state specialization, consider a discussion of an example system in accordance with one or more embodiments.

Example System

Figure 5:
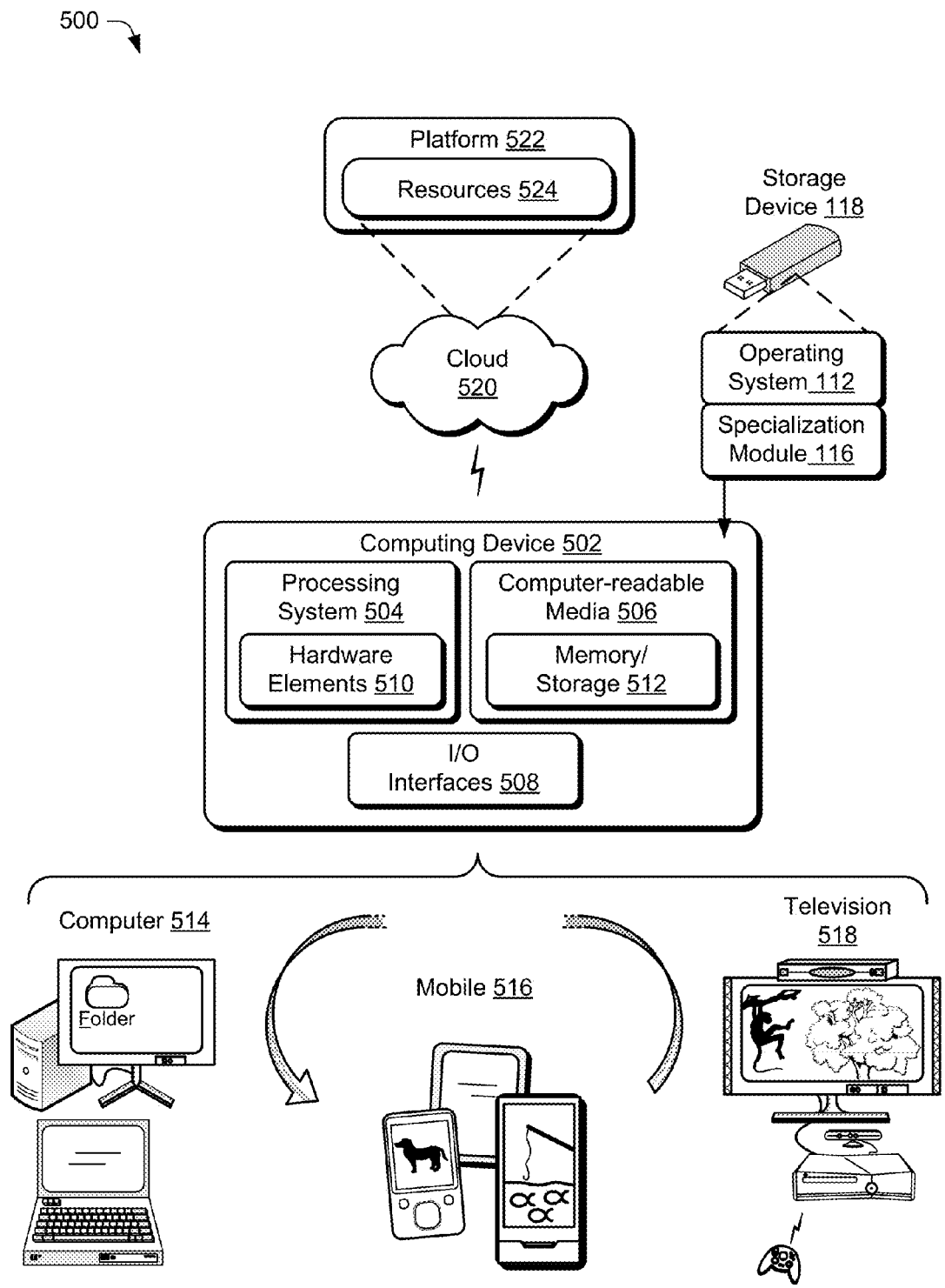
FIG. 5 is a block diagram of a system that can implement the various embodiments.

FIG. 5 illustrates an example system 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" may refer to media and/or devices that enable persistent storage of information in contrast to mere signal transmission, carrier waves, or signals per se. Thus, computer-readable storage media does not include signal bearing or transitory media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 112, applications 114, specialization module 115, and other program modules may be implemented as one or more instructions and/or logic embodied on some form of computer-readable storage media and/or by one or more hardware elements 510. Program modules may also be implemented by way of a storage device 118 or remote storage 120. By way of example, FIG. 5 illustrates an operating system 112 and a specialization module 116 as being provided by a storage device 118, such as a USB flash drive.

The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a distributed cloud environment implemented via one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. The functionality represented by the program modules/applications may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented by a computing device comprising:
    initiating booting, on the computing device, a portable installation of an operating system configured to enable migration of the operating system to different computing devices;
    ascertaining an identity corresponding to a particular hardware configuration of the computing device, the identity being suitable to identify the computing device and a particular combination of hardware resources with which the computing device is configured to result in the particular hardware configuration;
    determining whether any records maintained at a datastore are associated with the ascertained identity, the records being generated on a per hardware configuration basis as different hardware configurations are encountered when the portable installation of the operating system is booted, each of the records having hardware configuration state data selected when a different hardware configuration is encountered during the booting to specialize the portable installation of the operating system for the different hardware configuration; and
    when the ascertained identity is associated with one of the records, loading the portable installation of the operating system on the computing device with the hardware configuration state data of the associated record and selected when the particular hardware configuration was encountered.

2. The method as recited in claim 1, further comprising loading the portable installation of the operating system with default boot start drivers when the ascertained identity is not associated with any of the records of the datastore.

3. The method as recited in claim 2, wherein the records maintained at the datastore are each associated with an identity that is suitable to identify a respective computing device and hardware resource combination with which the respective computing device is configured.

4. The method as recited in claim 1, wherein the portable installation of the operating system is obtained from storage separate from the computing device.

5. The method as recited in claim 4, wherein the hardware configuration state data is stored in the datastore at the storage.

6. The method as recited in claim 1, wherein the portable installation of the operating system is obtained from remote storage over a network.

7. The method as recited in claim 1, wherein the hardware configuration state data for the particular hardware configuration designates a custom list of boot start drivers to pre-load when the operating system is booted with the particular hardware configuration.

8. The method as recited in claim 1, wherein the hardware configuration state data for the particular hardware configuration designates driver configuration data to configure one or more drivers utilized for operation of the particular hardware configuration.

9. The method as recited in claim 1, wherein the hardware configuration state data for the particular hardware configuration designates device settings to customize one or more of the hardware resources of the computing device according to the particular hardware configuration.

10. The method as recited in claim 1, wherein the hardware configuration state data for the particular hardware configuration designates application settings to customize one or more applications according to the particular hardware configuration.

11. The method as recited in claim 1, further comprising, when the ascertained identity is not associated with any of the records maintained at the datastore:
loading the portable implementation of the operating system using default state data;
performing an optimization routine to establish one or more specializations to apply for subsequent boots of the portable implementation of the operating system with the particular hardware configuration; and
generating a new record with hardware configuration state data that is selected for describing the established specializations in association with the ascertained identity.

12. The method as recited in claim 1, further comprising:
detecting that the particular hardware configuration is a new hardware configuration that has not been previously encountered by the portable implementation of the operating system; and
generating a notification in response to the detection to notify one or more system components of the new hardware configuration to facilitate specializations by the one or more system components for subsequent boots of the portable implementation of the operating system on the computing device.

13. A method implemented by a computing device comprising:
launching a boot program for a computing device to load a portable implementation of an operating system supplied to the computing device from remote storage over a network;
deriving a hardware identifier for the computing device in connection with launching the boot program, the hardware identifier identifying a particular hardware configuration that corresponds to the computing device and a particular combination of hardware resources with which the computing device is configured;
determining whether any records maintained at the remote storage are associated with the derived hardware identifier, the records being generated on a per hardware configuration basis as different hardware configurations are newly encountered when the portable implementation of the operating system is loaded, each of the records having hardware configuration state data created when a different hardware configuration is newly encountered during the loading to specialize the portable implementation of the operating system for the different hardware configuration; and
responsive to a determination that one of the records is associated with the derived hardware identifier:
obtaining the hardware configuration state data of the one record from the remote storage; and
loading the portable implementation of the operating system with one or more specializations designated by the obtained hardware configuration state data.

14. The method as recited in claim 13, further comprising, responsive to a determination that one of the records is not associated with the derived hardware identifier:
booting the portable implementation of the operating system using default state settings;
notifying one or more system components that a new hardware configuration is encountered to cause the one or more system components to designate specializations for subsequent boots of the portable implementation of the operating system on the computing device; and
creating the hardware configuration state data for the particular hardware configuration with the designated specializations to specialize the portable implementation of the operating system for the particular hardware configuration, the created hardware configuration state data added to a new record for storing at the remote storage.

15. The method as recited in claim 14, wherein the notifying comprises writing the hardware identifier as a value for a designated parameter at a defined location from which the one or more system components are configured to look-up the hardware identifier to discover when the portable implementation of the operating system is booted on the different hardware configurations.

16. The method as recited in claim 13, wherein the hardware configuration state data describes multiple different types of specializations including boot driver lists, driver configuration settings, and device settings.

17. A server computing device of a service provider, the server computing device comprising:
one or more computer-readable storage media implementing a service of the service provider for storing a plurality of records, each of the records having hardware configuration state data that is created when a different hardware configuration is encountered during booting of an operating system, the different hardware configuration corresponding to a different computing device and combination of hardware resources than other previously encountered hardware configurations;
a specialization module operable via processing systems associated with the different computing devices to:
generate the plurality of records on a per hardware configuration basis as different hardware configurations are encountered when loading a portable implementation of the operating system configured to boot on the different computing devices; and
provide the hardware configuration state data over a network to computing devices having hardware configurations associated with one of the records to specialize the portable implementation of the operating system for respective hardware configurations.

18. The server computing device of claim 17, wherein the service of the service provider is further implemented to store the portable implementation of the operating system, and the specialization module is further configured to provide the portable implementation of the operating system over the network to computing devices that launch a boot program to load the portable implementation of the operating system.

19. The server computing device of claim 17, wherein the records include the hardware configuration state data for one or more of the computing devices upon which the portable implementation of the operating system is booted, the hardware configuration state data for each particular computing device configured to describe multiple different types of specializations including boot driver lists, driver configuration settings, and device settings for booting of the portable implementation of the operating system with a hardware configuration for the portable computing device.

20. The server computing device of claim 19, wherein the specialization module is further configured to implement a clean-up process to remove hardware configuration state data for the records of selected computing devices that are selected based upon criteria established to control the removal.

* * * * *